(12) United States Patent
Lagerman

(10) Patent No.: US 8,055,185 B2
(45) Date of Patent: Nov. 8, 2011

(54) JAMMING DEVICE FOR MOBILE COMMUNICATION

(75) Inventor: Mikael Lagerman, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 742 days.

(21) Appl. No.: 12/158,885

(22) PCT Filed: Dec. 22, 2005

(86) PCT No.: PCT/SE2005/002035
§ 371 (c)(1),
(2), (4) Date: Jun. 23, 2008

(87) PCT Pub. No.: WO2007/073269
PCT Pub. Date: Jun. 28, 2007

(65) Prior Publication Data
US 2009/0047897 A1   Feb. 19, 2009

(51) Int. Cl.
*H04K 3/00* (2006.01)
(52) U.S. Cl. ............... 455/1; 455/434; 455/515; 455/68
(58) Field of Classification Search ............. 455/1, 66.1, 455/456.1, 456.2, 411, 445, 422.1, 431, 561, 455/419, 412, 466, 522, 418, 403, 434, 515, 455/68, 414.1; 370/347, 442; 380/278
See application file for complete search history.

(56) References Cited

U.S. PATENT DOCUMENTS

| | | | | |
|---|---|---|---|---|
| 5,029,184 A * | 7/1991 | Andren et al. | ................. | 375/138 |
| 2003/0114145 A1* | 6/2003 | Boda et al. | ..................... | 455/412 |
| 2003/0169722 A1* | 9/2003 | Petrus et al. | ................... | 370/347 |
| 2003/0224719 A1* | 12/2003 | Lucidarme et al. | ................ | 455/1 |
| 2005/0215241 A1* | 9/2005 | Okada | ......................... | 455/414.1 |
| 2007/0289775 A1* | 12/2007 | Potts et al. | ...................... | 174/350 |
| 2008/0299965 A1* | 12/2008 | Lagerman | ...................... | 455/431 |
| 2009/0220092 A1* | 9/2009 | Li et al. | .......................... | 380/278 |
| 2009/0270083 A1* | 10/2009 | Derosier et al. | .............. | 455/418 |

OTHER PUBLICATIONS

Mika Stahlberg "Radio jamming attacks against two popular mobile networks" In H Lipmaa and H Pehu-Lehtonen editors, Proceedings of the Helsinki University of Technology. Seminar on Network Security. Mobile Security. Helsinki University of Technology, Finland 2000 p. 8, line 35-line 39.

* cited by examiner

*Primary Examiner* — Tan Trinh

(57) ABSTRACT

The invention refers to a method for a screening device and a screening device (1), for a cellular communication system comprising a user equipment, UE, (UE) in a cellular network The invention is characterized in the screening device (1) is arranged to generate a pulsed first signal (S1) being matched to screen a control channel (S, F, B) in a second signal (S2) generated in the cellular network.

6 Claims, 3 Drawing Sheets

Fig. 1
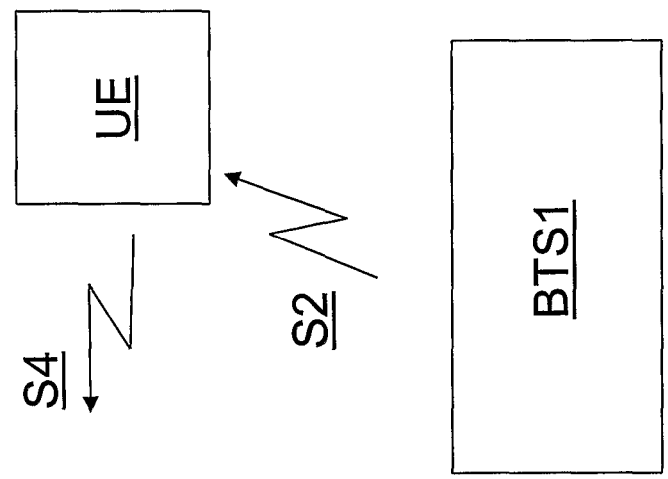
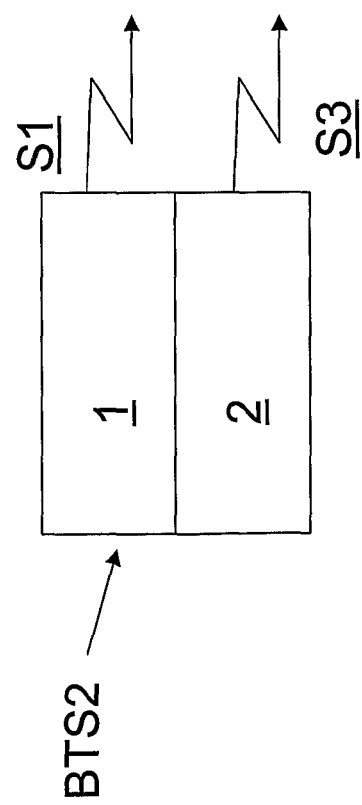

JAMMING DEVICE FOR MOBILE COMMUNICATION

ABBREVIATIONS

1 G First generation wireless mobile communication network
2,5G GPRS and EDGE.
2G Second generation wireless mobile communication network
3G Third generation wireless mobile communication network
4G Fourth generation wireless mobile communication network (CDMA+IS-95)
AMPS Advanced Mobile Phone Service (1G)
AMPS/D Digital Advanced Mobile Phone Service (2G)
BCCH Broadcast Control Channel, one of three BCH
BCH GSM Broadcast Channels, i.e. FCCH, SCH and BCCH
BTS Base Transceiver Station
CCCH Common Control CHannels
CDMA Code Divisional Multiple Access (3G)
CDMA2000 also known as IMT-CDMA Multi-Carrier or 1xRTT (3G)
DCCH Dedicated Control CHannel
EDGE Enhanced Data rates for GSM Evolution (2,5G)
FACCH Fast Association Control Channel
FCCH Frequency Correction Channel
GPRS General/GSM Packet Radio Service (2,5G)
GSM Global System for Mobile communications (2G)
IS-95 Interim Standard 95 (IS-95), is the first CDMA-based digital cellular standard
NMT Nordic Mobile Telephony (1G)
RBS Radio Base Station, the network access point in radio communication with UE served by the network.
SACCH Slow Association Control CHannel
SCH Synchronization Channel
SDCCH Standalone Dedicated Control Channel
TCH Traffic Control CHannel
TDMA Time Division Multiple Access
UE User Equipment, e.g. a cellular phone
UMTS Universal Mobile Telecommunications System (3G)

TECHNICAL FIELD

The invention refers to a method for a screening device and a screening device, for a cellular communication system comprising a user equipment, UE, in a cellular network.

BACKGROUND ART

In the field of mobile communication systems it is known to use mobile telephones (cellular phones) and other devices using means for wireless communication, hereinafter abbreviated UE for User equipment. The UE has an omni directional antenna sending out signals in a spherical pattern to a terrestrial system. The terrestrial system is built up from a number of cells managed by a number of base stations connected to ground antennas covering each cell. The ground antennas are normally not omni directional, but restricted to an azimuth angle giving a horizontal sector and an altitude angle giving a vertical sector.

The UEs communicate with that base station having the best communication parameters for the moment. When the communication parameters are altered for the worse, for example when the UE moves away from the base station and migrates to another cell, the UE moves from the weaker base station to a neighbouring base station with better communication parameters.

Cellular networks are sustained by a pattern of adjacent cells of radio coverage. First generation (1G) systems, such as NMT, AMPS, etc. and second generation (2G) system, such as GSM, utilize different frequencies to separate neighboring cells whereas UMTS using CDMA apply logical coding to achieve cell separation. The 2G systems uses TDMA to separate different users in the cell. The reason for using different frequencies and codes respectively is to minimise interference problems for UEs in neighbouring cells.

However, the numbers of frequencies are limited why the cellular pattern has to be repeated in a larger area, in order to use the same frequency a number of times.

Today there is no method to prevent a mobile from initiating access to any network it has previously been granted access to on a national/operator level. If the home operator has a roaming agreement with an operator in another country the UE may then be able to interconnect anywhere while within radio coverage of that operator's network.

Even without this approval, all GSM UEs, shall be allowed to make emergency calls in any network while within coverage, why some interaction will take place unless measures are made.

There are some situations when a government, the operator of the network or others, like to prevent a UE to interact with the home network or other networks. For example, in order to even out traffic loads; or puncture a cell and force the UE to move to another cell thereby moving the cell boarders; or hinder traffic for reasons of secrecy, for example in a prison or in an aeroplane or in a library, etc. The signal may also be blocked in order to hinder disturbance in other competing networks, for example a client using a different operator.

Therefore, there is a desire for an improved communication control system that can manage communication/traffic between a UE and a base station more effectively.

DISCLOSURE OF INVENTION

The invention refers to a screening device for a cellular communication system comprising a user equipment UE in a cellular network. The invention is characterised in that the screening device is arranged to generate a pulsed first signal being matched to screen a control channel in a second signal in the cellular network.

Here "screen" refers to the first signal being transmitted in the same region where the second signal is transmitted such that the first signal is superposed onto at least that part of the second signal comprising the control channel thereby disturbing the information in the control channel. If the information is disturbed the UE cannot read the information and cannot therefore establish a connection.

Here "match" refers to the screening device being fed information on the second signal in the form of duration, effect, repetition interval and position of the control channel in the second signal, and from that information calculating and generating the pulsed first signal with a suitable pulse interval and repetition interval and effect so that the pulsed first signal disturbs the second signal during that time period the control channel is transmitted in the network.

One benefit of the invention is that only a part of the second signal needs to be blocked in order to prevent the UE to establish a connection with the network. Therefore the screening device does not have to be used continuously. On the contrary the screening device generates the first signal in the form of one pulse with a predetermined pulse interval and at a predetermined repetition interval. The predetermined pulse interval and the predetermined repetition interval shall be set such that the control channel is blocked. The screening device thus uses only a fraction of the duration of the second signal. The benefit of the invention thus lies in the screening device being less power consuming and may, for the same power usage, thus be utilised at a higher degree than a continuous screening device by generating a number of different pulses for screening of additional signals from the network.

Another advantage of the invention is that a pulsed first signal contributes as little as possible to the overall back noise. It is desirable to keep the noise at as low level as possible in order to gain as large signal to noise ratio as possible. This means that the network may transmit signals with less effect in order to overcome the noise for the UE to be able to distinguish the signal.

The second signal is generated by a base station, for example a base transceiver station, (hereinafter called BTS). The BTS manages a geographical area often referred to as a cell. In one type of system both the BTS and the UE are transceivers, i.e. each being a device for a two way communication acting as both sender and receiver. However, the screening device may also be used in a one way communication system where the BTS is a sender and the UE is a receiver.

In a GSM based communication system the pulsed first signal has a first effect in a first frequency utilised by the UE and the network. The first effect in the first signal is matched to screen the control channel in the second signal.

In GSM, a frequency band is divided, using a FDMA scheme, into a number of carrier frequencies (also called frequency channels) with 25-30 kHz bandwidth being spaced one from each other by a 200 khz frequency band measured from the apex of the 25-30 KHz bandwidth. Each carrier frequency is then divided in time using a TDMA scheme. This scheme splits the radio channel into 8 time slots. A time slot is the unit of time in a TDMA system, and it lasts approximately 0.577 ms. A TDMA frame is formed with 8 time slots and lasts, consequently, 4.616 ms. Each of the eight time slots, that form a TDMA frame, are then assigned to a single user for traffic. However, in GPRS it is possible for a user to obtain a number of time slots in order to get access to increased data rate. Each TDMA designates one time slot to a control channel in the form of a BCH and designates the rest of the time slots to traffic channels TCH and control channels in the form of CCCH and/or DCCH. It is only the BCH that needs to be disturbed in order to prevent traffic. The BCH burst length is also referred to as a BCH batch. Three different types of BCHs can be distinguished BCHs are used, by the BTS (here a transceiver), to provide the mobile station with the sufficient information it needs to synchronize with the network. The BCH burst length extends over 5 and ⅛ TDMA frames and consequently 23.657 ms long The BCH burst length is also referred to as a BCH batch. Three different types of BCHs can be distinguished:
  The Broadcast Control Channel (BCCH), which gives to the UE the parameters needed in order to identify and access the network
  The Synchronization Channel (SCH), which gives to the UE the training sequence needed in order to demodulate the information transmitted by the base station
  The Frequency-Correction Channel (FCCH), which supplies the UE with the frequency reference of the system in order to synchronize it with the network In order to prevent GSM traffic it is only necessary to screen frequency channels transmitting any of the BCHs.

Furthermore, theoretically only frequency channels transmitting the BCH batch needs to be screened in order for the receiving UE to be prevented from initiating network connection due to the low quality of the received signal. Theoretically this can be achieved by the screening device being time synchronized with the network and where the first signal has pulse interval of one time slot and a repetition interval being identical to the BCH burst length.

Since the screening device is not necessarily time synchronized with the network, the first signal needs a theoretical minimum pulse interval of 4.616 ms (eight Time Slots) in order to secure screening of one full, or parts of two, BCH Time Slots. With BCH burst length that equals 23.657 ms the screening device must transmit periodically with a period time not exceeding 23.5 ms to secure not to risk any BCH batch to pass through intact.

However, testing has shown an optimal screening effect when the pulse interval in the first signal is at least 7 ms with a repetition interval of maximum 23.5 ms.

Compared to screening the second signal continuously by sending the first signal as a continuous signal interfering with the second signal in its entirety, the present invention uses a duty cycle of 30% compared to continuous screening in order to screen GSM transmission.

The screening device can utilize the silent time of the duty cycle to screen additional frequency channels and thereby increase the screening capability of the screening device by a factor about three compared to continuous screening. A further advantage is that the screening device can use 70% additional effect compared to the continuous screening or, for the same effect as the continuous signal, being 70% less power consuming and thus giving 70% additional useful life when running on battery. One additional advantage is that the 70% power saving gives the possibility to increase the output signal three times with the same useful life as a continuously operated screening device.

Another advantage of the invention is that the source of the screening device will also be more difficult to track and locate due to the intermittent signalling.

One effect of the invention is that the first signal screens the second signal so that the UE cannot establish a communication link and cannot therefore home in on a certain frequency within the frequency band of the second signal.

At present, the 2G GSM frequencies are evenly distributed over the GSM-1800 and over the GSM-1900 bands. A cell normally uses between two and 12 different frequencies.

The invention is not limited to a GSM based system, but may be used on different systems using a second signal with a BCH batch (BCH burst length) different number of time slots with different duration and different number of control channels. The invention must then be adapted by altering the pulse interval and the pulse repetition interval in the first signal accordingly.

For example, the screening device may be used in a CDMA (Code Division Multiple Access) system using codes to identify connections. The screening device must here be matched to generate a first signal with a pulse length and repetition interval matching the corresponding control channel.

In a CDMA based communication system the first signal is matched to disturb the pilot signal and may comprise a code. The pilot signal in a CDMA based system corresponds to the BCH batch in the TDMA based GSM system. However, in a CDMA based system the BCH batch may be in a different form than the above stated, and the control channel in such a signal is disturbed with a pulsed signal.

In one embodiment of the invention, the screening device is arranged to generate the pulsed first signal with a pulse length being of the same length or at least of the same length as the pulse length of the control channel and with a repetition interval less than the BCH batch for the communication system in question.

In another embodiment of the invention, the screening device is arranged to generate the pulsed first signal with a pulse length being of the same length or at least of the same length as the pulse length of the control channel and with a repetition interval identical to the repetition interval of at least one control channel within a broadcast channel burst length.

In the two latter embodiments, the above mentioned advantages are maintained.

The screening device may be comprised in the BTS transmitting the second signal. The benefit of this solution is that the communication between the UE and the BTS may be controlled by the screening device without any changes being made in the second signal.

The screening device may also be comprised in a second BTS positioned at a distance from the BTS transmitting the second signal. The benefit of this solution is that the second signal may be disturbed in a specific geographical area being less than the operation area of the BTS and the second signal, without any alterations of the UE, the BTS or the second signal. The disturbance controls the communication between the UE and the BTS according to above.

The screening device may comprise a signal detection device that detects the second signal from the network. The information is utilized by the screening device when determining the signal strength and frequency of the first signal. However, the screening device may lack a detection device, but may instead be programmed for certain events, i.e. the first signal has a signal strength and frequency already set for different events. The screening device may then be controlled to use different modes dependent on the event at hand. The screening device may be controlled both manually and automatically.

The screening device may be comprised in a BTS also comprising a signal generator generating a third signal being stronger than the first and the second signal. The third signal is intended to be utilised by the UE in order to establish a dedicated communication link.

The third signal has a predetermined effect in a predetermined frequency band when leaving the BTS so that the ratio between the third signal and the second signal corresponds at least to the minimum requirement for signal to noise ratio accepted by the UE in order to establish a communication link.

The third signal may comprise information intended for the control of the UE. Examples of such information is maximum transfer unit that limits the output effect of the UE and maximum time advance giving the UE information on how large the cell is.

BRIEF DESCRIPTION OF DRAWINGS

The invention will below be described further in connection to a number of drawings where:

FIG. 1 schematically shows a traffic scheme in a network comprising a screening device according to the invention and a UE;

EMBODIMENT OF THE INVENTION

FIG. 1 schematically shows a traffic scheme in a network comprising a screening device 1 according to the invention and a UE. The screening device 1 is comprised in a second base transceiver station BTS2 together with a signal generator 2. The network also comprises a second base transceiver station BTS2 intended for communication with UEs within a cell.

The screening device 1 generates and transmits a first signal S1 from the BTS1. The BTS2 generates and transmits a second signal S2 intended for the UE to receive in order to establish a communication link. The signal generator 2 generates a third signal S3. The UE transmits a fourth signal S4 in an omni directional pattern intended to be used for establishing the communication link between the UE and the BTS2 via the third and fourth signals.

The first signal S1 is intended to screen the second signal S2 to such an extent that the UE cannot establish a communication link with the BTS2. The third signal is identical to the second signal or different, but the third signal is stronger than both the first and the second signal. Since the third signal is stronger, the UE can establish a communication link with BTS 1 via the third and the fourth signal.

However, the invention refers mainly to the screening device and the screening device could therefore be used without the signal generator 2, i.e. without transmitting the third signal. In this embodiment, the UE is hindered from establishing any communication link at all.

Both the BTS1 and the BTS2 transmit signals by use of a transmitting unit (not shown) and receives signals by use of a receiving unit (not shown).

Figure 2:
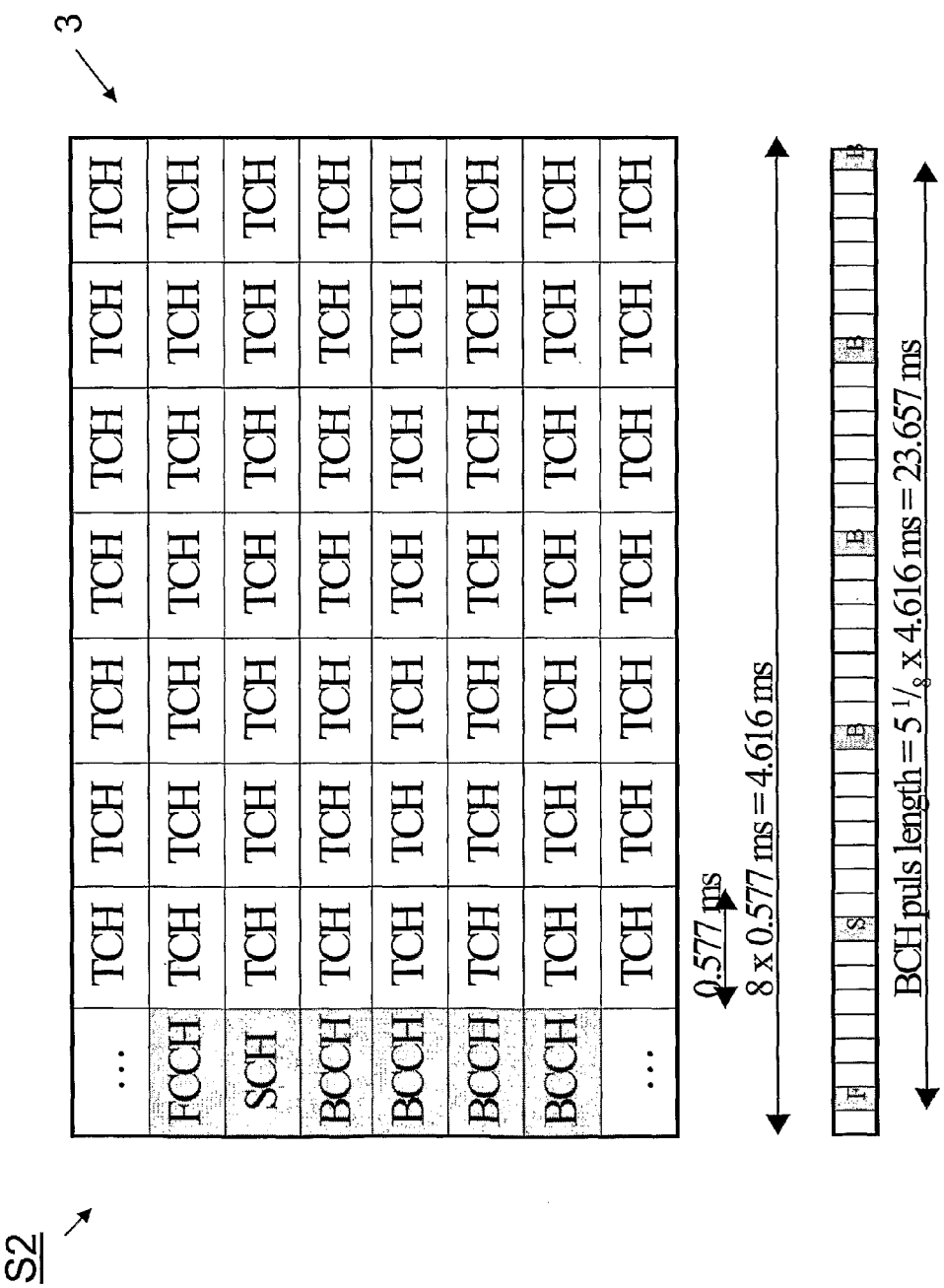
FIG. 2 schematically shows a BCH batch transmission pattern in a GSM based system, and where.

FIG. 2 schematically shows a BCH batch transmission pattern 4 in the second signal S2 in a GSM based system. The transmission pattern should be read from left to right and from the top to the bottom row by row. In FIG. 2 the BCH batch is also shown as a sequence of time slots below the transmission pattern.

GSM is a TDMA technique with multiple frequency channels. Each frequency channel is divided into a TDMA frame comprising eight time slots, assigned to control channels or traffic channels (half rate or full rate TCH). The control channels comprises BCH and CCCH. Each time slot is 0.577 ms long and the BCH burst length is 5 and ⅛ TDMA frames and consequently 23.657 ms long.

Each TDMA designates one time slot to a control channel in the form of a BCH, CCCH (not shown) or DCCH (not shown) and designates seven time slots as traffic channels TCH. BCH channels are used, by the BTS, to provide the mobile station with the sufficient information it needs to synchronize with the network. The BCH burst length extends over 5 and ⅛ TDMA frames and is consequently 23.657 ms long. The BCH burst length is also referred to as a BCH batch. Three different types of BCHs can be distinguished: the BCCH depicted with the letter B; the SCH depicted with the letter S, and FCCH depicted with the letter F.

In order to prevent GSM traffic it is only necessary to screen frequency channels transmitting any of the BCH.

Figure 3:
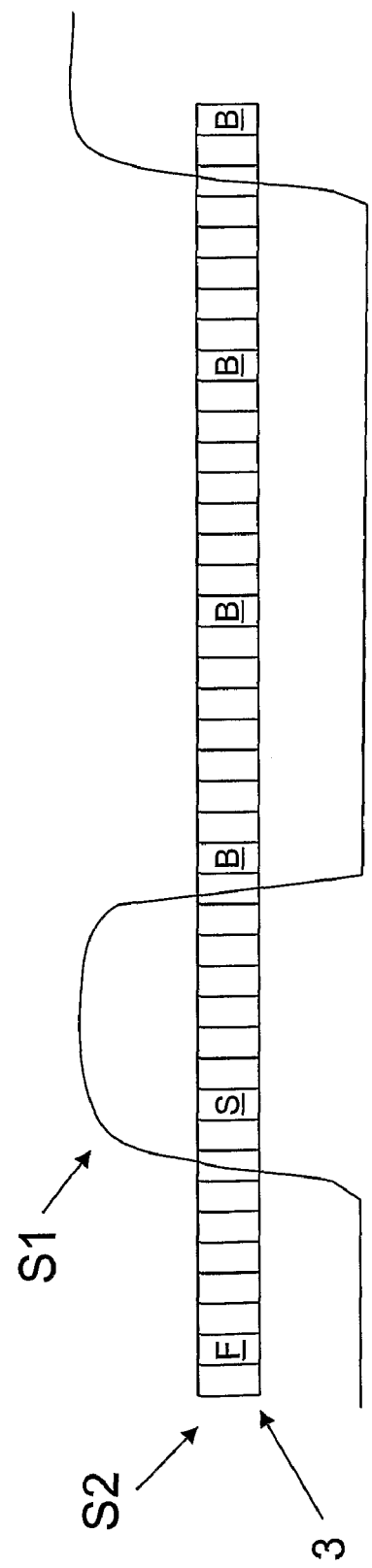
FIG. 3 schematically shows a second embodiment of the invention where a first signal from the inventive screening device is superposed on a second signal being a GSM transmission according to FIG. 2.

FIG. 3 schematically shows a first signal from the inventive screening device superposed on a second signal being a GSM transmission according to FIG. 2. In FIG. 3, the synchronization channel S is screened by the pulsed first signal S1. With BCH burst length that equals 23.657 ms the screening device periodically transmits a pulse with a pulse length being at least 7 ms and with a repetition interval not exceeding 23.5 ms. The first signal also has an effect matching the effect of the second signal such that the signal to noise ration becomes low enough for the UE to disregard the information in the control channel. The features of the pulsed first signal hinders that any BCH batch pass through intact.

The invention claimed is:

1. A jamming device for a cellular communication system having a user equipment in a cellular network, wherein the jamming device is arranged to generate a pulsed first signal being matched to jam a control channel in a second signal generated in the cellular network, the second signal being a broadcast channel signal transmitted from a first base transceiver station for establishment of a communication link between the first base transceiver station and the user equipment, wherein the jamming device is arranged to generate the pulsed first signal with a pulse length of at least the same length as the pulse length of the control channel in the second signal and with a repetition interval less than the broadcast channel burst length.

2. The jamming device according to claim 1, wherein the jamming device is arranged to generate the pulsed first signal with a pulse length of at least the same length as the pulse length of the control channel and with a repetition interval identical to the repetition interval of at least one control channel within a broadcast channel burst length.

3. The jamming device according to claim 1, for a GSM cellular communication system, wherein the jamming device is arranged to generate the pulsed first signal with a pulse length being at least 7 ms and with a repetition interval having a maximum value of 23.5 ms.

4. A method for a jamming device in a cellular communication system having a user equipment and a cellular network, wherein the jamming device generates a pulsed first signal being matched to jam a control channel in a second signal in the cellular network, the second signal being a broadcast channel signal transmitted from a first base transceiver station for establishment of a communication link between the first base transceiver station and the user equipment, wherein the jamming device generates the pulsed first signal with a pulse length of at least the same length as the pulse length of the control channel and with a repetition interval less than the broadcast channel burst length.

5. The method for a jamming device according to claim 4, wherein the jamming device generates the pulsed first signal with a pulse length of at least the same length as the pulse length of the control channel and with a repetition interval identical to the repetition interval of at least one control channel within a broadcast channel burst length.

6. The method for a jamming device according to claim 4 for a GSM cellular communication system, wherein the jamming device generates the pulsed first signal with a pulse length being at least 7 ms and with a repetition interval having a maximum value of 23.5 ms.

* * * * *

UNITED STATES PATENT AND TRADEMARK OFFICE
CERTIFICATE OF CORRECTION

| | | |
|---|---|---|
| PATENT NO. | : 8,055,185 B2 | Page 1 of 1 |
| APPLICATION NO. | : 12/158885 | |
| DATED | : November 8, 2011 | |
| INVENTOR(S) | : Lagerman | |

It is certified that error appears in the above-identified patent and that said Letters Patent is hereby corrected as shown below:

On the Title Page, in Item (57), under "ABSTRACT", in Column 2, Line 3, delete "network" and insert -- network. --, therefor.

In Column 1, Line 6, delete "1 G" and insert -- 1G --, therefor.

In Column 6, Line 62, delete "repetion" and insert -- repetition --, therefor.

Signed and Sealed this
Twenty-ninth Day of May, 2012

David J. Kappos
*Director of the United States Patent and Trademark Office*